United States Patent
Cole et al.

(10) Patent No.: US 6,567,602 B2
(45) Date of Patent: May 20, 2003

(54) FIBER-OPTIC CABLE TROUGH, LOW-PROFILE PCB MOUNT

(75) Inventors: Guy A. Cole, Boca Raton, FL (US); Babak B. Makooi, Boca Raton, FL (US); Albrecht Neudecker, Boca Raton, FL (US); Eric Nelson, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/902,846

(22) Filed: Jul. 11, 2001

(65) Prior Publication Data

US 2003/0012543 A1 Jan. 16, 2003

(51) Int. Cl.[7] .................................................. G02B 6/00
(52) U.S. Cl. ....................................... 385/136; 385/137
(58) Field of Search ................................ 385/134, 135, 385/136, 137

(56) References Cited

U.S. PATENT DOCUMENTS

| | | | | |
|---|---|---|---|---|
| 5,469,526 A | * | 11/1995 | Rawlings | 385/135 |
| 5,715,348 A | * | 2/1998 | Falkenberg et al. | 385/135 |
| 5,949,947 A | * | 9/1999 | Eslambolchi et al. | 156/94 |
| 6,192,180 B1 | * | 2/2001 | Kim et al. | 385/135 |
| 6,308,000 B1 | * | 10/2001 | Ikeda et al. | 385/136 |

* cited by examiner

Primary Examiner—Euncha Cherry

(57) ABSTRACT

A fiber-optic cable guide includes first and second guide walls, one or more base support elements for connecting the guide walls, and a number of securing elements which extend from the guide walls along a top portion thereof. Each securing member preferably has a length which is shorter than the spacing between the guide walls. This difference in length substantially corresponds to the diameter of a fiber-optic cable. A fastener may be included on a bottom surface of one or more of the guide walls for attaching the guide to a mounting surface, which may be a printed circuit board. Furthermore, the guide walls may be conformed to traverse any desired path along the board.

22 Claims, 5 Drawing Sheets

FIBER-OPTIC CABLE TROUGH, LOW-PROFILE PCB MOUNT

BACKGROUND OF THE INVENTION

1. Field of the Invention

This invention generally relates to structures for holding optical fibers, and more particularly to a guide for mounting one or more fiber-optic cables along a predetermined path on a printed circuit board or other surface where fiber-optic cables are typically routed.

2. Description of the Related Art

Fiber-optic communications have been embraced by the telecommunications industry principally for their large bandwidth and high signal speeds. Recently, there has been a push towards using fiber-optic cables to connect board-mounted components or to connect various components in a network. As the capacity of network servers increases, so too must the number of optical fibers.

Several problems have developed from this increased capacity. Perhaps most significantly, while advances have been made in optical connector technology, very little attention has been paid to managing the space concerns of fiber-optic cables on a printed circuit board or other mounting surface. In the conventional case, fiber-optic cables are unsecured to the board. This creates a cluttered nest of intertwined cables that not only increases the effective dimensions of the board but also makes the cables vulnerable to damage from heat or natural wear and tear. And, this problem is only exacerbated as the number of cables increases.

Several conventional approaches have been taken to guide fiber-optic cables on a printed wiring board. As shown in FIG. 7, one approach involves mounting single-point, adhesive-attachment cable clamps 70 at strategic places on the board surface. These clamps have proven undesirable for a number of reasons. First, the clamps are not equipped with protective features which prevent the fibers from being bent past their minimum bend radius (e.g., 30 mm) when the cables are routed at sharp angles. Second, the adhesives used to mount the clamps on the board often fail, and consequently the fiber may move from its intended position. If severe enough, the fiber may protrude in a manner which causes it to get caught and/or broken when the board is removed, for example, for maintenance or replacement purposes.

In view of the foregoing considerations, it is apparent that there is a need for a fiber-optic cable guide which not only may be used to mount one or more optical fibers on a board, but which does so in a manner which protects the optical fibers from damage from external influences.

SUMMARY OF THE INVENTION

It is one object of the present invention to provide a fiber-optic cable guide which mounts one or more optical fibers to a mounting surface (e.g., a printed circuit board) in a manner which simultaneously protects the optical fibers from damage.

It is another object of the present invention to provide a fiber-optic cable guide which may be curved, twisted, or otherwise modified to coincide with the most efficient route on a mounting surface with regard to other components to be mounted on that surface.

It is another object of the present invention to provide a fiber-optic cable guide which holds one or more fiber-optic cables to a mounting surface irrespective of the orientation of the mounting surface.

The foregoing and other objects of the invention are achieved by providing a fiber-optic cable guide which includes first and second guide walls and one or more base support members for connecting the guide walls and for supporting a number of optical fiber cables from below. To secure the cables from above, at least one securing member extends from one of the side walls. Depending on the length of the guide, a plurality of securing members may be used. Each of the securing members has a length which is shorter than the spacing between the guide walls. Preferably, this difference in length substantially corresponds to the diameter of a fiber-optic cable. One or more of the guide walls may include a fastener for attaching the guide to a printed circuit board or other mounting surface. Furthermore, the guide walls may be modified to traverse the most efficient path on the mounting surface, taking into consideration other hardware elements that are to be included on that surface.

DESCRIPTION OF THE PREFERRED EMBODIMENTS

The present invention is a guide which holds, protects, and guides one or more fiber-optic cables along a predetermined route on a mounting surface. The mounting surface may be the surface of a printed circuit board, as will be discussed in greater detail below. However, those skilled in the art can appreciate that the guide may be adapted to mount to other surfaces or devices. The cable guide is particularly well suited for use in the telecommunications industry where optical networking equipment is used, and in the computer industry where, for example, fiber-optic connectors are used to link computers to peripheral devices.

Figure 1A:
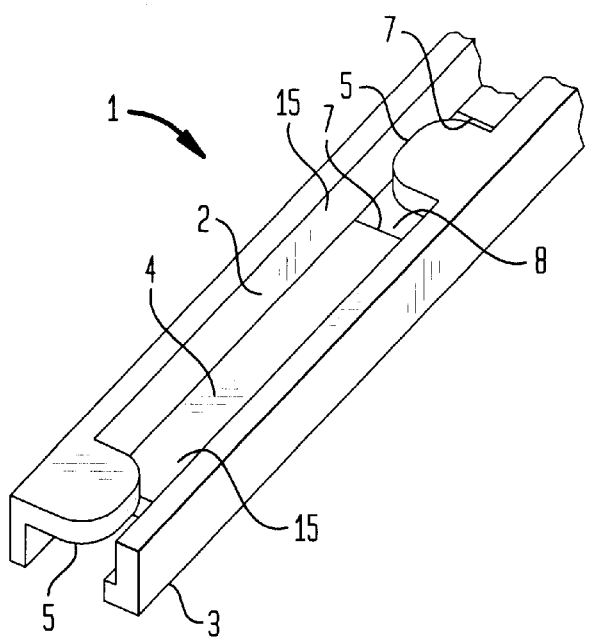
FIG. 1(a) is a diagram showing a partial, exploded view of a fiber-optic cable guide in accordance with one embodiment of the present invention.
Figure 1B:
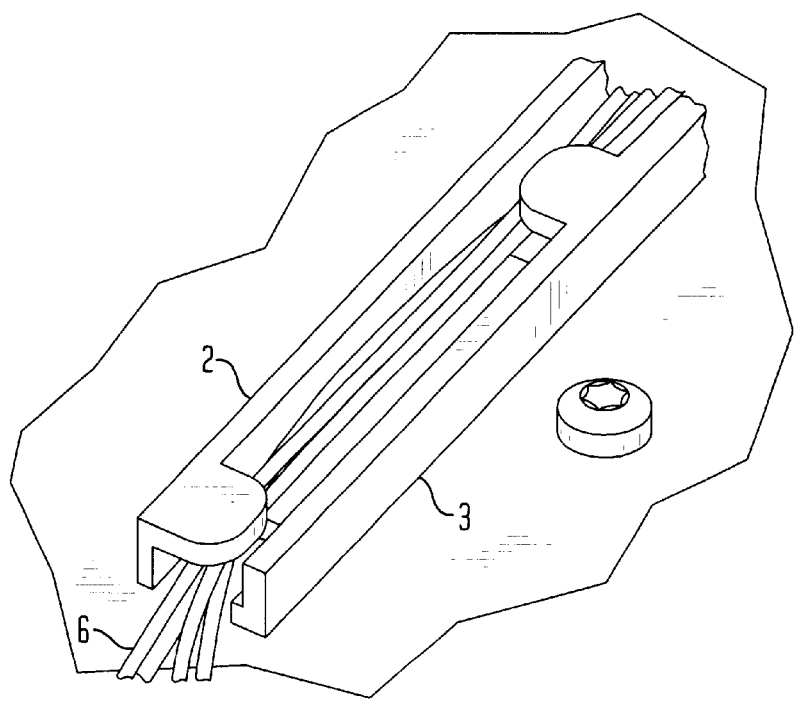
FIG. 1(b) is a diagram showing this guide holding a plurality of fiber-optic cables.

Referring to FIGS. 1(a) and 1(b), a first embodiment of the fiber-optic cable guide 1 of the present invention includes a first guide wall 2, a second guide wall 3, a bottom 4, and at least one securing member 5. Preferably, the first and second guide walls have the same height, which exceeds at least the diameter of one fiber-optic cable. If desired, however, the heights of these walls may be varied in order to accommodate the space into which the guide is to be mounted. It is also preferable that the guide walls be spaced from one another by a distance sufficient to hold a plurality of fiber-optic cables, or cable bundles. This will maximize the usable space on the surface to which the cables are to be mounted.

The guide is preferably molded as a single piece in a predetermined shape. As such, the guide walls may be made of a rigid material such as plastic or metal, or a semi-rigid material such as rubber which can bend in various directions to establish the most efficient travel route on the mounting surface. FIG. 1(b) shows the guide of the present invention holding a plurality of fiber-optic cables 6.

The bottom of the guide is formed from one or more base support members 7, each of which span a width of the guide at that location. When plural base support members are used, each of them preferably has the same width so as to allow the guide walls to be parallel throughout their length. The base members may, however, be modified to have different widths in order to change the spacing between the walls where necessary, e.g., in order to accommodate space on a mounting surface or accept additional fiber optic cables. Alternatively, the lengths of the base members may be equal to or different from one another, depending on the mounting requirements. It is also preferable that the spacings 8 between the base support members be equal. However they too may be varied as desired. Like the guide walls, the base support members may be made from a rigid, semi-rigid, or flexible material.

Figure 2A:
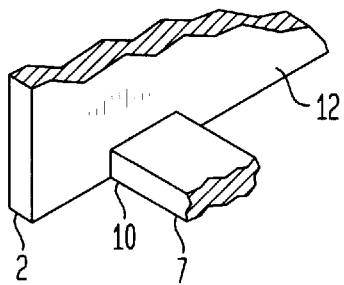
FIG. 2(a) is a diagram showing one approach for connecting the base support member(s) of the present invention to the guide walls.
Figure 2B:
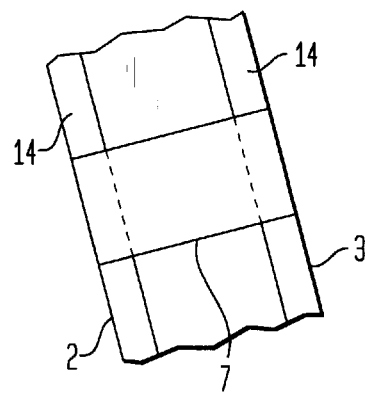
FIG. 2(b) is a diagram showing another approach for connecting the base support member(s) of the present invention to the guide walls.

The base support members may be connected to the bottom portions of the guide walls in various ways. For example, as shown in FIG. 2(a), ends 10 of each support member may be attached to an interior portion 12 of the guide walls. Alternatively, the support members may be attached to the bottom surface 14 of the walls, as shown in FIG. 2(b). The members may be integrally formed with the walls (e.g., as a portion of a one-piece construction) or may be attached using an adhesive, rivets, screws, or other conventional fasteners.

Figure 3:
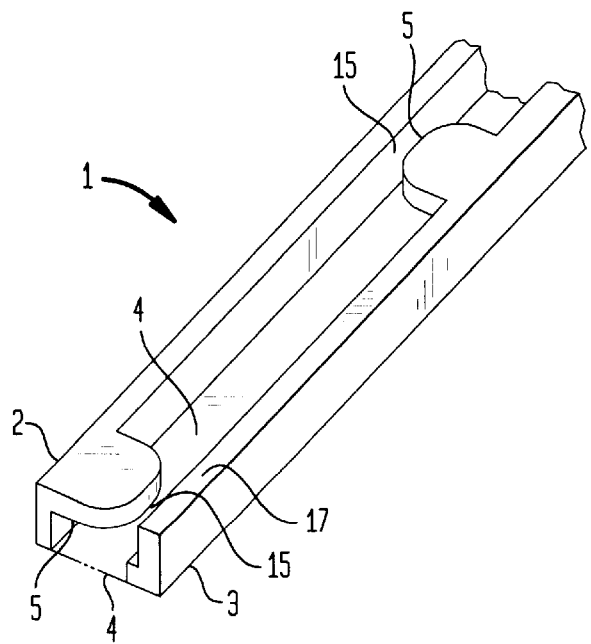
FIG. 3 is a diagram showing a fiber-optic cable guide in accordance with another embodiment of the present invention.

The guide walls and base support member(s) of the present invention not only perform the functions of holding and guiding one or more fiber-optic cables along a predetermined route on a mounting surface, they also protect the cables from damage from external influences such as heat and abrasive wear and tear. To enhance this protective function, FIG. 3 shows an alternative embodiment of the guide that has a consistent, solid bottom (i.e., one with no apertures) and which runs throughout the length of the guide.

The securing member(s) extend from top portions of the guide walls and preferably are made of the same material from which the guide walls and the bottom are made. The securing members perform at least two functions. First, each member provides an opening 15 for allowing the fiber-optic cable to enter the interior of the guide at that location. To perform this function, the length of each securing member is made shorter than the spacing between the walls. Alternatively, the securing member is constructed of a flexible material so that it may be bent upwardly or downwardly to allow the insertion of the fiber optic cable over the top edge 17 of guide wall 3. Second, the length of the securing members are sufficient to reduce the chances of the fiber-optic cable falling out of the guide, should the guide be shifted in position, jolted, or turned upside down. These chances may be minimized by making the difference between the wall spacing and the length of the securing member less than or substantially equal to the diameter of a fiber-optic cable. An opening 15 wider than a single fiber optic cable may be formed, however, when the guide is intended to hold a plurality of fiber-optic cables, or cable bundles. Advantageously, the securing members of the present invention also perform a third function of protecting the cables from damage from external influences.

The length of the guide may be used as a basis for determining the number of securing members that are to be included. For example, a short guide may need only one securing member, while longer guides may require a plurality of securing members. When a plurality of securing members are used, they preferably extend in alternating relationship from the guide walls. Thus, for example, every even-numbered securing member may extend from guide wall 2 and every odd-numbered securing member may extend from guide wall 1. Alternatively, all the securing members may extend from the same guide wall.

The position of the securing members may be selected based on the location of the apertures or spacings in the bottom of the guide. As shown in FIG. 1, for example, looking along a vertical axis passing perpendicularly through the bottom of the guide, the securing members 5 are located in alignment with the spacings 8 in the bottom, i.e., at the spaces between the base support members 7. This arrangement is preferred because if the guide is ever rotated or turned upside down, the fiber-optic cables will be assured of staying within the guide. If desired, the securing members may be aligned with the base support members.

Figure 4A:
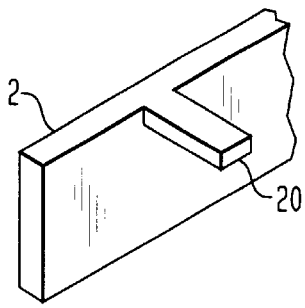
FIG. 4(a) is a diagram showing one alternative configuration for the securing members of the present invention.
Figure 4B:
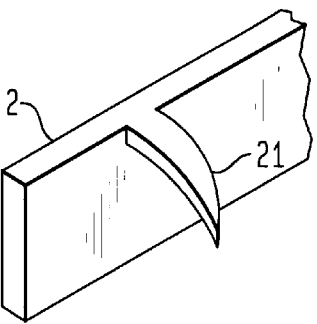
FIG. 4(b) is a diagram showing another alternative configuration for the securing members of the present invention.

In FIGS. 1 and 3, the securing members are shown as tab-shaped flanges which are integrally formed with top portions of the guide walls. The securing members, however, may be constructed differently. For example, the flanges may be attached to the guide walls by adhesives or other conventional means. Also, as shown in FIG. 4(a), the securing members may be in the form of cantilevered beams 20 or downwardly curved rod-shaped or hook members 21, as shown in FIG. 4(b).

Figure 5:
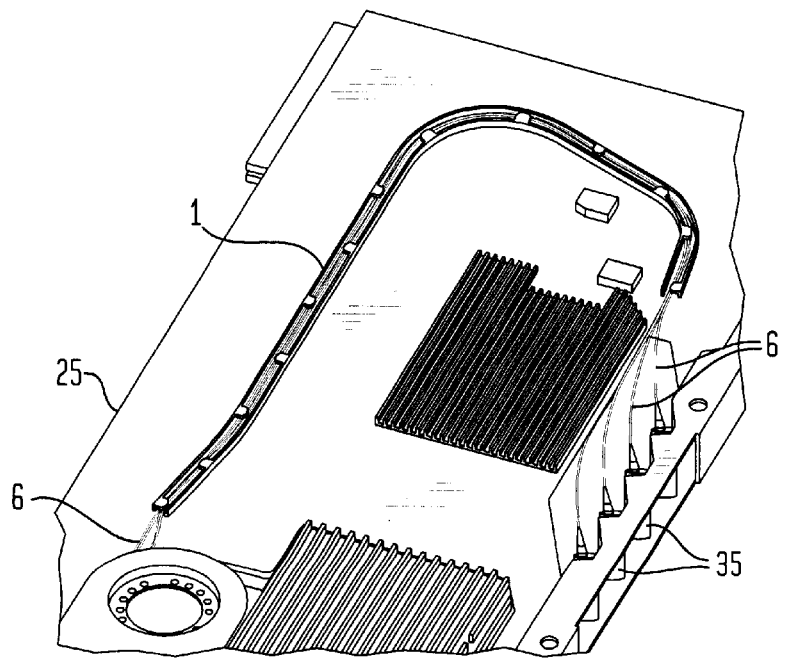
FIG. 5 is a diagram showing the fiber-optic cable guide of the present invention mounted along a predetermined route on the surface of a printed circuit board.

One particularly advantageous embodiment of the guide of the present invention is shown in FIG. 5. In this figure, the guide 1 is mounted to a surface of a printed circuit board 25 containing various circuit elements. The guide is bent to follow a predetermined route along the board, which route is preferably selected to avoid the circuit elements in the most efficient manner possible. By using the guide of the present invention, a plurality of fiber-optic cables originating from an area 30 on the board is guided along this route as a compact, protected, and securely held unit which cannot be compromised when the board is shifted in position or turned upside down. The cables exit the guide to connect with respective opto-electronic devices or connectors, shown generally at 35.

Figure 6:
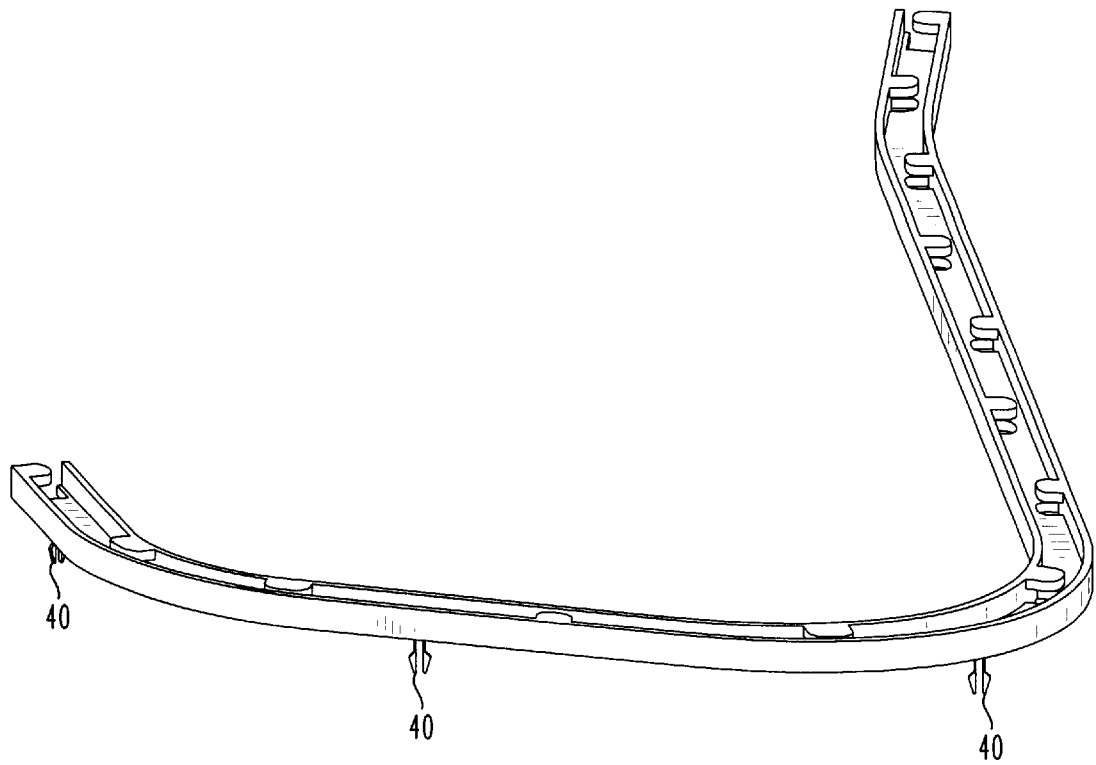
FIG. 6 is a diagram showing an exemplary set of fasteners used to mount the fiber-optic cable guide onto a printed circuit board or other mounting surface.
Figure 7:
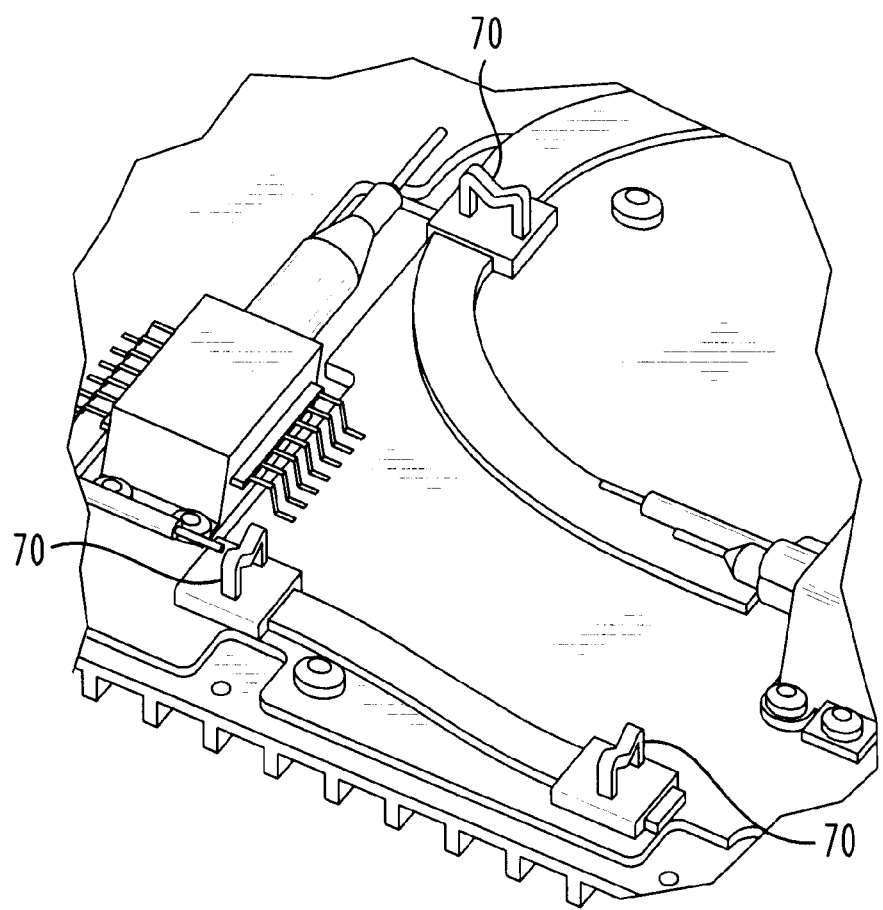
FIG. 7 shows a conventional approach for mounting fiber-optic cables on a printed wiring board.

The guide is mounted onto the printed circuit board using one or more fasteners, which may be mounted to the bottom surfaces of the guide walls preferably in alternating relationship for stability purposes. As shown in FIG. 6, each of the fasteners may take the form of a pair of inwardly deflecting snap members 40 which are adapted to fit into a hole in the printed circuit board. These snap members are only illustrative of the invention, since other types of fasteners may be used including press pins, double-sided adhesive tape, or screws.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. An optical fiber guide, comprising
a first guide wall;
a second guide wall spaced from said first guide wall;
at least one base support member having a first end and a second end and adapted to be mounted to a surface of a device, said first and second ends connecting bottom portions of said first guide wall and said second guide wall, respectively; and
a plurality of flange members extending in alternating relationship from top portions of said first guide wall and said second guide wall, respectively.

2. The optical fiber guide of claim 1, wherein said plurality of flange members have a length which is shorter than a spacing between said first guide wall and said second guide wall.

3. The optical fiber guide of claim 2, wherein a difference between the length of at least one flange member of said plurality of flange members and the spacing between said first guide wall and said second guide wall is substantially equal to a diameter of one fiber-optic cable.

4. The optical fiber guide of claim 2, wherein a spacing between said plurality of flange members and said at least one base member, in one direction, is sufficient to accommodate a plurality of fiber-optic cables.

5. The optical fiber guide of claim 1, wherein said at least one base member is a plurality of base support members connecting bottom portions of said first guide wall and said second guide wall, said base support members being separated from one another by predetermined spacings.

6. The optical fiber guide of claim 5, wherein said predetermined spacings are equal.

7. The optical fiber guide of claim 5, wherein said plurality of flange members each have a length which is shorter than a spacing between said first guide wall and said second guide wall.

8. The optical fiber guide of claim 7, wherein said flange members are located between said at least one base support member when viewed from a vertical axis which passes through one of said base support member.

9. The optical fiber guide of claim 1, wherein said second guide wall is spaced from said first guide wall by a distance sufficient to accommodate a plurality of fiber-optic cables.

10. The optical fiber guide of claim 1, wherein said first guide wall is parallel to said second guide wall.

11. The optical fiber guide of claim 1, wherein at lest one flange member of said plurality of flange members have a length which is substantially equal to the spacing between said first guide wall and said second guide wall; said plurality of flange members being deformably flexible so as to permit insertion of a fiber optic cable between one if said first and second guide walls and said plurality of flange members and into said optical fiber guide.

12. The optical fiber guide of claim 1, wherein said bottom portions of said first guide wall and said second guide wall are mounted onto a surface of printed circuit board.

13. The optical fiber guide of claim 12, further comprising:
at least two fasteners extending from said bottom portions of said first guide wall and said second guide wall respectively, said fasteners connecting said first guide wall and said second guide wall to the surface of said printed circuit board.

14. The optical fiber guide of claim 13, wherein each of said fasteners includes two inwardly deflectable snap members adapted for insertion into a hole in the surface of said printed circuit board.

15. The optical fiber guide of claim 12, wherein said first guide wall and said second guide wall define a predetermined guide path for at least one fiber-optic cable along the surface of said printed circuit board.

16. A fiber-optic cable guide mounted on a printed circuit board, comprising:
a first wall;
a second wall;
a bottom having a first end and a second end, said first and second ends connecting portions of said first wall to said second wall, respectively, wherein the bottom includes spacings therebetween; and
at least one flange member extending from the first wall towards said second wall, said flange member having a length which is shorter than a spacing between said first wall and said second wall, said at least one flange member extending in an alternating relationship from top portions of said first wall and said second wall, respectively.

17. The fiber-optic cable guide of claim 16, wherein a difference between the length of said at least one flange member and said spacing between said first wall and said second wall is substantially equal to a diameter of one fiber-optic cable.

18. The fiber-optic cable guide of claim 16, wherein said bottom includes a number of apertures.

19. The fiber-optic cable guide of claim 16, further comprising at least two fasteners extending from a bottom of said first wall and said second wall respectively, said fasteners connecting said first wall and said second wall to a surface of a printed circuit board.

20. The fiber-optic cable guide of claim 19, wherein each of said fasteners includes two inwardly deflectable snap members adapted for insertion into a hole in the surface of said printed circuit board.

21. The optical fiber guide recited in claim 19, wherein said first wall and said second wall define a predetermined guide path for at least one fiber-optic cable along the surface of said printed circuit board.

22. A fiber-optic cable guide mounted on a printed circuit board, comprising:
a first wall;
a second wall;
a bottom having a first end and a second end, said first and second ends connecting portions of said first wall to said second wall, respectively, wherein the bottom includes spacings therebetween and a number of apertures; and
at least one flange member extending from the first wall towards said second wall, said flange member having a length which is shorter than a spacing between said first wall and said second wall, said at least one flange member being a plurality of flange members extending in an alternating relationship from top portions of said first wall and said second wall respectively, said plurality of flange members overlapping the aperture in said bottom when viewed along an axis which passes perpendicularly through a top surface of said first wall.

* * * * *